United States Patent [19]

Maffrand et al.

[11] Patent Number: 5,223,295
[45] Date of Patent: Jun. 29, 1993

[54] PROCESS FOR THE ELIMINATION OF STEROID COMPOUNDS CONTAINED IN SUBSTANCE OF BIOLOGICAL ORIGIN

[75] Inventors: Jean-Pierre Maffrand, Portet sur Garonne; Jean Courregelongue, Portet/Garonne, both of France

[73] Assignee: Asterol International, Paris, France

[21] Appl. No.: 707,959

[22] Filed: May 22, 1991

Related U.S. Application Data

[63] Continuation of Ser. No. 295,429, Jan. 10, 1989, abandoned.

Foreign Application Priority Data

Jan. 22, 1988 [FR] France .................. 8800730

[51] Int. Cl.⁵ .................. C07K 3/02; C07K 15/06; C07H 1/08
[52] U.S. Cl. .................. 426/431; 536/5; 536/6.3; 536/103; 536/127; 530/359; 530/412; 424/581; 210/634; 426/614
[58] Field of Search .................. 536/5, 6.3, 103, 127; 530/359, 412; 514/26, 169; 426/425, 614; 210/634; 424/581

[56] References Cited

U.S. PATENT DOCUMENTS

| | | |
|---|---|---|
| 2,746,957 | 5/1956 | Perlman et al. .................. 536/5 |
| 2,827,452 | 3/1958 | Schlenk et al. .................. 536/103 |
| 3,061,444 | 10/1962 | Rogers et al. .................. 536/103 |
| 3,491,132 | 1/1970 | Reiners et al. .................. 260/420 |
| 3,933,789 | 1/1976 | Pegel .................. 536/5 |
| 4,383,992 | 5/1983 | Lipari .................. 536/103 |
| 4,555,504 | 11/1985 | Jones .................. 536/5 |
| 4,804,555 | 2/1989 | Marschner .................. 260/420 |
| 4,880,573 | 11/1989 | Courregelongue et al. .................. 260/420 |
| 5,024,846 | 6/1991 | McLachlan et al. .................. 426/312 |
| 5,026,565 | 6/1991 | McLachlan et al. .................. 260/412.8 |
| 5,034,378 | 7/1991 | Cox .................. 514/23 |
| 5,045,242 | 9/1991 | Roczniak et al. .................. 260/424 |

FOREIGN PATENT DOCUMENTS

| | | |
|---|---|---|
| 0462710 | 1/1950 | Canada . |
| 59-41395 | 3/1984 | Japan . |
| 2109381 | 6/1983 | United Kingdom . |

OTHER PUBLICATIONS

Kraybill et al., Industrial and Engineering Chemistry 1940 pp. 1138-1139.
Lepage; Journal of Lipid Research 5:587-592 (1964).
Saenger; Angew. Chem. Int. Ed. Engl. 19:344-362 (1980).
Szejtli; Die Nahrung 29:911-924 (1985).
Yamamoto et al.; Int. J. Pharmaceut. 49:163-171 (1989).
Bracco et al.; Chemical Abstracts 97:4925f (1982).
Tokarska et al.; Chemical Abstracts 103:177193m (1985).

*Primary Examiner*—Johnnie R. Brown
*Assistant Examiner*—Nancy S. Carson
*Attorney, Agent, or Firm*—Wegner, Cantor, Mueller & Player

[57] ABSTRACT

The present invention relates to a novel process for the elimination of steroid compounds contained in a substance of biological origin by complexing the steroidal compounds by means of a cyclodextrin, in an aqueous medium, under agitation at a temperature between 20° and 80° C. and then separating the complexes so formed.

11 Claims, No Drawings

PROCESS FOR THE ELIMINATION OF STEROID COMPOUNDS CONTAINED IN SUBSTANCE OF BIOLOGICAL ORIGIN

This application is a continuation of U.S. application Ser. No. 07/295,429 filed Jan. 10, 1989, now abandoned.

The present invention relates to a process for the elimination of steroid compounds contained in a substance of biological origin.

In the present invention steroid compounds are understood to mean mainly sterols in the non-esterified state or in esterified form and the molecules resulting from their oxidation.

It is known that sterols, which are 3-$\beta$-hydroxysteroids, have a biological origin. This is why a large number of substances derived from animals or plants contain them.

In fats of animal origin, cholesterol, mainly present in non-esterified form, accounts for 98 per cent of the sterols present. J. P. WOLFF (in Manuel d'Analyse des Corps Gras—Manual for the Analysis of Fats,—Azoulay, Ed., Paris, 1968) gave the following sterol contents, expressed as mg per 100 g of raw fat:

| LARD | BEEF SUET | HORSE FAT | SARDINE FAT |
| --- | --- | --- | --- |
| 50–120 | 75–140 | 80–120 | 275–500 |

Fats of vegetable origin are by contrast particularly low in cholesterol. But they contain other sterols in amounts, which vary according to their origin, but are significant (80 to 1200 mg for 100 g according to J. P. WOLFF above). Among these sterols, hereinafter called phytosterols, there may be mentioned: $\beta$-sitosterol, campesterol, stigmasterol, brassicasterol, $\Delta^7$-stigmastenol, $\Delta^7$-campesterol, $\Delta^5$-avenasterol, $\Delta^7$-avenasterol, $\Delta^{7-9}$-stigmatadienol, fucosterol, and ergosterol, these being the major sterols in the main edible vegetable oils.

Mention may also be made of birds, eggs, the sterol fraction of whose yolk essentially comprises cholesterol. The latter represents close to 5 per 100 of the total lipids in hens, eggs; there, 84 per 100 of it is present in non-esterified form, and 16 per 100 in esterified form.

It is also known that steroidal ketones, hereinafter called sterones, resulting from the oxidation of sterols, can be detected in these fats or in eggs (V. P. FLANAGAN et al., Journal of Lipid Research, 16, 1975, 97–101).

Other sterol derivatives whose presence is observed (G. MAERKER, J.A.O.C.S., N° 3, 1987, 388–392; S. W. PARK et al., Journal of Food Science, 51, N° 5, 1986, 1380–1381; J. M. LUBY, Journal of Food Science, 51, N° 4, 1986, 908–911), most particularly in much re-used frying oil, must also be mentioned: these are oxygenate derivatives containing hydroxyl groups.

Fats of animal or vegetable origin have a great many applications, useful in numerous fields of activity. They can be treated to yield manufactured products such as butter, which contains 225 to 350 mg of cholesterol per 100 g on average (J. P. WOLFF above), the oils commonly used for human consumption or alternatively chocolate. The importance of eggs in the preparation of foodstuffs is also known.

Epidemiological studies (Lipid Research Clinics Program, The Lipid Research Clinics Coronary Primary Prevention Trials, J. Amer. Med. Aas., 1984, 251, 351–374) have established a positive correlation between high levels of cholesterol in the plasma and cardiovascular diseases.

A role for the hydroxyl-containing oxygenated derivatives of cholesterol is also glimpsed in certain human pathological conditions, such as atheroma plaque formation (S. K. PENG et al., Atherosclerosis, 54, 1985, 121–133) and caccinogenesis. The sterones could also be implicated in cardiovascular diseases.

These observations reveal how opportune would be the development of an elimination process enabling significant reductions to be achieved in the quantities of sterols and their derivatives contained in substances of biological origin that are edible either as such or that are converted to foodstuffs by treatment.

Much work has been done but none has led to a really satisfactory process: precipitation with digitonin, solvent extraction which can leave toxic residues in the fats; lastly, column absorption and microdistillation are difficult processes to carry out on an industrial scale for they involve heavy equipment and complex and costly handling.

As it happens, the Applicant has developed a new general process which may be used on an industrial scale and enables sterols and their derivatives contained in substances of biological origin to be at least partially eliminated. This process is suitable for many applications: it especially enables the preparation of foodstuffs containing reduced amounts of sterols and derived molecules; it incidentally makes available quantities of sterols and derived molecules which can ultimately undergo appropriate treatment to produce steroids—mainly steroidal hormones—useful as active ingredients of medicines.

The process according to the invention takes advantage of the inherent capacity of cyclodextrins to form inclusion complexes with certain organic molecules.

Cyclodextrins are cyclic oligosaccharides consisting of glucopyranose units joined together by an alpha-(1 →4) glycosidic link. They have a hydrophobic cavity which allows inclusion complexes to be formed by insertion of molecules. Their toxicity has also been studied and it has been observed that oral administration of these cyclodextrins has revealed no toxic effect in rats and in dogs (J. SZEJTLI, Molecular Entrapment and Release Properties of Drugs by Cyclodextrins, in Controlled Drug Bioavailability, Vol. 3; V. F. SMOLEN and L. A. BALL, ed. 1985 J. WILEY, p. 365; W. SAENGER, Angew. Chem. Ed. Engl., 180, 19, 344).

Cyclodextrins are now mainly used for complexing pesticides. Other applications have been described, particularly their use for extracting free fatty acids from vegetable oils (J. SZEJTLI, Die Nahrung, 29,(1985), (911–924) but their use for extracting sterols and their derivatives had never before been contemplated.

The process according to the invention comprises a sterol complexing phase followed by a phase in which the resulting complexes are separated.

The complexing phase is carried out by bringing the cyclodextrin into contact with the substance requiring treatment.

According to a first embodiment the cyclodextrin is supplied in free form: it may be as an amorphous crystalline powder or as an aqueous solution.

The complexing phase requires an aqueous reaction medium to enable the complexes to be dispersed. It is, however, possible to carry out this phase by bringing the cyclodextrin into contact with the substance requiring treatment without adding water so long as this substance itself contains water, however.

When the substance requiring treatment takes the form of a dehydrated powder—such as for example powdered egg—addition of water is then indispensable. It must finally be noted that when the substance requiring treatment is a solid fat at normal temperature, it should be fluidised by appropriate heat treatment before being brought into contact with the cyclodextrin.

Contact is preferably effected at a temperature close to 40° C. The temperature may be between 20° C. and 40° C., but this does not suit the treatment of a substance that is solid at normal temperature and requires preheating to pass into the liquid state; furthermore, the reaction is then slower. The temperature may be higher than 40° C. and may even reach 80° C. It is for the person skilled in the art to choose a temperature that will not lead to an undesired modification of the substance requiring treatment.

The required contact time in the complexing phase varies widely. It obviously depends particularly on the quantity of steroidal compounds contained in the material requiring treatment and on the percentage of sterol compounds which it is desired to eliminate. It may be several hours, at least two hours. A contact time of 5 hours in particularly appropriate. This contact is also helped by agitation, which is advantageously sustained throughout this complexing phase.

Betacyclodextrin (or $\beta$-cyclodextrin) comprising seven glucopyranose units is used preferentially. $\beta$-Cyclodextrin derivatives such as 2,6-di-O-methyl-$\beta$-cyclodextrin, 2,3,6-tri-O-methyl-$\beta$-cyclodextrin and other cyclodextrins, such as $\alpha$-cyclodextrin, whose dimensions also allow inclusion complexes to be formed, may be used.

The amounts of cyclodextrin used may vary from 0.5% to 30% by weight relative to the amounts of substance taken for treatment. The proportion of cyclodextrin to be used is a function of the concentration of sterols and sterol derivatives in the substance requiring treatment and of the desired elimination efficiency.

Other suitable embodiments of this complexing phase involve liquid chromatography on a solid phase to which the cyclodextrin is grafted, or the use of cross-linked or modified cyclodextrins.

The inclusion complexes, formed by the sterol and sterol derivative molecules with the cyclodextrin molecules in the course of this first phase are then eliminated by a physical process. Centrifuging at 8000 g proves particularly appropriate. The complexes are localized in the pellet whence they may be extracted. If the substance requiring treatment is a fat, the supernatant comprises two phases, an oil phase floating above an aqueous phase in which the excess cyclodextrin remaining free is localized. This excess may be removed particularly by fractional crystallization.

The steroidal compounds whose elimination from a substance of biological origin is enabled by the process according to the invention are non-esterified sterols, esterified sterols whatever the carbon chain length (4 to 26 carbon atoms) and the degree of unsaturation (0 to 6 double bonds) in the fatty acid and the molecules derived therefrom, mainly after oxidation. Among these molecules sterones such as $\Delta^4$-3-cholestenone and $\Delta^{3,5}$-7-cholestadienone and hydroxyl group-containing derivatives such as 3$\beta$,5,6$\beta$-cholestanetriol may particularly be mentioned.

The process according to the invention is suitable for the treatment of all substances of biological origin. It is more particularly suitable for the treatment of fats of animal or vegetable origin and egg-based products.

In short, the process according to the invention enables the elimination of at least up to 80% of the sterols and sterol derivatives contained in a substance requiring treatment, the percentage of sterols and sterol derivatives eliminated depending in particular on the amounts thereof present in the substance. This efficiency can be further improved by subjecting the substance in the same manner to a second then possibly a third treatment with further quantities of cyclodextrin.

The invention also relates, according to a second aspect, to the substances with reduced contents of sterols and sterol derivatives that may be obtained by the process involved. Examples of embodiments of the invention are described below, without limiting the scope.

EXAMPLE 1

Treatment of Egg-Based Products to Reduce Their Cholesterol Content

Three starting materials differing in their physico-chemical structure,
powdered egg yolk (sold by Avicole Breton CECAB Delaunay- France),
fresh egg yolk taken whole from whole egg (eggs sold by Poitou Oeufs-France)
whole fresh egg (eggs sold by Poitou Oeufs), have been treated.

Operating procedure

The samples are prepared by adding either 40 g of distilled water to 10 g of product (powdered egg yolk and whole fresh egg) or 60 g of distilled water to 10 g of product (fresh egg yolk).

To each sample so prepared and homogenized, $\beta$-cyclodextrin (sold by ROQUETTE) is added in the form of an amorphous crystalline powder.

4 samples of each product are used; $\beta$-cyclodextrin ($\beta$-CD) is added to them in such a manner that the weight ratio of $\beta$-CD to the product is equal to 0.05, 0.10, 0.15, 0.20, 0.25 or 0.30. (cf. Table 1)

After agitation on a table mixer the samples are placed in an enclosure regulated at 40° C. and are maintained at this temperature for 5 hours.

A sample of each product, designed to serve as control, is subjected to a treatment differing from that described above only in that no $\beta$-cyclodextrin is added.

Each sample is then centrifuged at 8000 g. A pellet containing the $\beta$-cyclodextrin/cholesterol complexes, surmounted by a supernatant, is obtained.

The residual cholesterol content in the supernatant after centrifuging is determined by the method of C. S. J. SHEN et al. (Enzymatic determination of cholesterol in egg yolk—J. Assoc. Off. Anal. Chem., 65, n° 5, 1982, 1222-1224).

Results

The results are given in Table I and each sample is identified by its $\beta$-CD/Product ratio.

It is observed that placing 10 g of powdered egg yolk in contact with 40 g of distilled water and 1 g of $\beta$-cyclodextrin has enabled the initial cholesterol content to be reduced by 26% in a single extraction.

In the course of this trial it has been possible to reduce the cholesterol content of powdered egg yolk by 74%, of fresh egg yolk by 57% and of whole fresh egg by 83%.

TABLE I

QUANTITY OF CHOLESTEROL EXPRESSED IN mg/100 g and PERCENTAGE ELIMINATION OF CHOLESTEROL WITH RESPECT TO THE CONTROL (%)

| PRODUCT TREATED | CONTROL | β-CD/ PRODUCT 0.05 | β-CD/ PRODUCT 0.10 | β-CD/ PRODUCT 0.15 | β-CD/ PRODUCT 0.20 | β-CD/ PRODUCT 0.25 | β-CD/ PRODUCT 0.30 |
|---|---|---|---|---|---|---|---|
| POWDERED EGG YOLK | 2580 | — — | 1898 (26) | — — | 1442 (44) | 1098 (57) | 672 (74) |
| FRESH EGG YOLK | 1369 | — — | 1102 (19) | 879 (35) | 709 (48) | — — | 581 (57) |
| WHOLE FRESH EGG | 462 | 277 (40) | 84 (81) | 82 (82) | 78 (83) | — — | — — |

EXAMPLE 2

Treatment of a Refined Sunflower Oil

The oil that was used is one sold under the tradename LESIEUR.

Operating procedure

Two samples are prepared. In each case, to 10 g of oil are added distilled water (10 g) then β-cyclodextrin (ROQUETTE), in the form of an amorphous crystalline powder, in amounts of 500 mg for one sample (hereinafter sample β-CD/product=0.05) and 1 g for the other sample (hereinafter sample β-CD/ product=0.10).

After agitation on a table mixer, the samples are placed in an enclosure regulated at 40° C. and are maintained at this temperature for 5 hours.

The samples are then centrifuged at 8000 g. A pellet containing the β-cyclodextrin/sterol complexes, surmounted by a supernatant is obtained. The supernatant comprises an aqueous phase surmounted by an oil phase. The latter is collected.

A sample designed to serve as control is subjected to a treatment differing from that described above only in that no β-cyclodextrin is added.

The total sterol content of the oil phase is determined by the standard method for the determination of total sterols in oils and fats recommended by the Union Internationale de Chimie Pure et Appliquée (International Union of Pure and Applied Chemistry) (M. NAUDET et al.—Revue Francaise des Corps gras (French Review of Fats) n° 4, April 1986, 167-170).

Results

The results are given in Table II. They are expressed by stating the values obtained for β-sitosterol, which is the major sterol component of sunflower oil.

TABLE II

| | QUANTITY OF STEROLS EXPRESSED IN mg of β-sitosterol per 100 g | PERCENTAGE ELIMINATED % |
|---|---|---|
| Control sample | 200 | — |
| Sample β-CD/ PRODUCT = 0.05 | 124 | 57 |
| Sample β-CD/ PRODUCT = 0.10 | 52 | 82 |

It is observed that it has been possible to eliminate 82% of the total sterols initially contained in the oil.

EXAMPLE 3

Treatment of a Fat to Which a Sterol Ester Has Been Added

Principle

The substance treated is a fat to which cholesterol stearate has been added in such an amount that the equivalent mass of cholesterol is 9 to 15 times greater than that of cholesterol "naturally" contained in this fat.

Operating procedure 4 samples are prepared by solubilizing, for each sample, cholesterol stearate, marketed by SIGMA, in an amount comprising about 30 mg for two samples (Trial 1 and Control 1) and about 50 mg for the other two (Trial 2 and Control 2), in 10 g of anhydrous milk fat itself containing 2 mg of cholesterol and fluidized beforehand.

To each of the 2 samples prepared for Trails 1 and 2 are added 10 g of distilled water and β-cyclodextrin, hereinafter β-CD, in the form of an amorphous crystalline powder (ROQUETTE), 503 mg in one (Trial 1) and 768 mg in the other (Trial 2).

After agitation on a table mixer, the 4 samples are placed in an enclosure regulated at 40° C. and are maintained at this temperature for 5 hours.

The samples are then centrifuged at 8000 g. A pellet, containing the β-cyclodextrin/cholesterol or β-cyclodextrin/cholesterol stearate complexes, surmounted by a supernatant, is obtained. The supernatant comprises an aqueous phase with an oil phase above it.

The oil phase is collected then saponified. The cholesterol passes into the unsaponifiable portion in which it is assayed by an enzymatic method using a diagnostic kit sold by Boehringer Mannheim under the reference 139-050.

TABLE III

| | MASS β-CD mg | MASS OF CHOLESTEROL STEARATE EFFECTIVELY INTRODUCED mg | CALCULATED MASS OF CHOLESTEROL mg | ASSAYED MASS OF CHOLESTEROL mg | % CHOLESTEROL ELIMINATED |
|---|---|---|---|---|---|
| CONTROL 1 | 0 | 30.5 | 18.07 | 17,95 | 0 |
| TRIAL 1 | 503 | 30.6 | 18.13 | 12,45 | 31 |
| CONTROL 2 | 0 | 50.8 | 30.10 | 30,95 | 0 |
| TRIAL 2 | 768 | 50.5 | 29.92 | 19,27 | 35 |

EXAMPLE 4

Treatment of a Fat Containing Oxygenated Derivatives of Sterols

Operating procedure

An anhydrous milk fat is subjected to several cycles of heating (150° C.-1h) between which it is allowed to return to room temperature.

To 10 g of this fat prepared in this way (hereinafter used fat) and previously fluidified, are added 10 g of water and 500 mg of β-cyclodextrin in the form of an amorphous crystalline powder (ROQUETTE).

After agitation on a table mixer, this sample and also a second sample treated in an identical manner but to which no β-cyclodextrin has been added, and destined to serve as control, are placed in an enclosure regulated at 40° C. and are maintained at this temperature for 5 hours.

Both samples are then centrifuged at 8000 g. A pellet, containing the oxygenated sterol derivative/β-cyclodextrin complexes, surmounted by a supernatant, are obtained. The supernatant comprises an aqueous phase with an oil phase above it.

The oil phase is saponified.

The unsaponifiable fractions are analysed by thin-layer chromatography according to the method described by J. M. LVBY (Journal of Food Science, 51, n° 4, 1986, 904–907).

Results

The presence of two spots is observed on the plate for the control sample fraction, corresponding to two cholesterol oxides. These two spots are also found for the fraction corresponding to the sample prepared from the treated fat, but their intensity is very much lower.

EXAMPLE 5

Treatment of a Fat Containing a Sterone

Operating procedure

The substance used is anhydrous milk fat that has previously been subjected to the action of a bacterial strain biosynthesizing an extracellular cholesterol oxidase, containing 240 mg of Δ4-3-cholestenone per 100 g (and hereinafter called MGLA-BIO).

Two samples (Trials 1 and 2) are prepared. For each one, to 10 g of this fat are added 10 g of water and 500 mg of β-cyclodextrin in the form of an amorphous crystal-line powder (ROQUETTE).

After agitation on a table mixer, the two samples and also two other samples, prepared in an identical manner but to which no β-cyclodextrin has been added, are centrifuged at 8000 g. A pellet, containing the inclusion complexes formed with the β-cyclodextrin, surmounted by a supernatant, are obtained. The supernatant comprises an aqueous phase with an oil phase above it.

The oil phase is collected; 2 g of it are taken and added to a mixture of methanol and methylene chloride (50/50 v/v). The volume of the solution A thus prepared is made up to 100 ml with the same mixture. This produces a solution B which is analysed by high performance liquid chromatography.

A steel column of length 25 cm and internal diameter 4.6 mm, containing Spherisorb RP 18 gel (ready-to-use column of type S 5 ODS 2 marketed by Phase Sep under the reference 820 019) and a pre-column of length 1.5 cm and internal diameter 3.2 mm containing a 7 micron C18 phase (ready-to-use column marketed by Touzart et Matignon under the reference 014 380 12) are used.

A test sample of 20 microliters of the solution B is injected. Elution is carried out with phase comprising 95 volumes of methanol and 5 volumes of methylene chloride, which is circulated for 15 minutes at a rate of 1.0 ml per minute. $\Delta^4$-3-Cholestenone gives a main peak with a retention time close to 13 minutes. Elution is continued to allow washing of the stationary phase and to return it to its initial equilibrium.

Results

The results are given in Table IV.

TABLE IV

| | CONTROL SAMPLE | | SAMPLE WITH β-CYCLODEXTRIN MGLA BIO = 0.05 | |
|---|---|---|---|---|
| | | | TRIAL | TRIAL |
| | 1 | 2 | 1 | 2 |
| Δ4-3-cholestenone mg per 100 g | 238 | 239 | 40 | 39 |
| Percentage elimination | 0 | 0 | 83 | 84 |

It is observed that in each of the two trials it has been possible to eliminate more than 80% of the sterone.

We claim:

1. A process for reducing the amount of steroidal compounds contained in an egg based product, in which the said egg based product is brought into contact with at least 0.5% by weight with respect to the weight of said egg based product of a cyclodextrin in aqueous medium, this contact is maintained with agitation, at a temperature chosen so as not to lead to an undesired modification of the egg based product, so as to enable the steroidal compounds and the cyclodextrin to form complexes, then the said complexes are separated from the egg based product.

2. A process according to claim 1, in which the egg based product is powdered egg yolk.

3. A process according to claim 1, in which the egg based product is fresh egg yolk.

4. A process according to claim 1, in which the egg based product is whole fresh egg.

5. A process according to claim 1, in which the amount of cyclodextrin is at least 5% by weight with respect to the weight of said egg based product.

6. A process according to claim 1, in which the amount of cyclodextrin used is not more than 30% by weight relative to the amount of said egg based product.

7. A process according to claim 1, in which the contact is carried out for at least two hours.

8. A process according to claim 1, in which the contact is carried out at a temperature close to 40° C. for 5 hours.

9. A process according to claim 1, in which said cyclodextrin is $\beta$-cyclodextrin.

10. A process as claimed in claim 1 in which said contact is maintained at a temperature below 80° C.

11. A process as claimed in claim 1 by which the amount of cholesterol is reduced.

* * * * *